United States Patent
Liu et al.

(10) Patent No.: US 11,501,536 B2
(45) Date of Patent: Nov. 15, 2022

(54) IMAGE PROCESSING METHOD, AN IMAGE PROCESSING APPARATUS, AND A SURVEILLANCE SYSTEM

(71) Applicant: SAMSUNG ELECTRONICS CO., LTD., Suwon-si (KR)

(72) Inventors: Weiheng Liu, Beijing (CN); Yinlong Qian, Beijing (CN); Hyunku Lee, Suwon-si (KR); Qiang Wang, Beijing (CN); Keunjoo Paul Park, Suwon-si (KR); Hyunsurk Eric Ryu, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 371 days.

(21) Appl. No.: 16/776,660

(22) Filed: Jan. 30, 2020

(65) Prior Publication Data

US 2020/0394418 A1    Dec. 17, 2020

(30) Foreign Application Priority Data

Jun. 14, 2019   (CN) .......................... 201910517273.6

(51) Int. Cl.
  *G06K 9/00*   (2022.01)
  *G06V 20/52*  (2022.01)
  (Continued)

(52) U.S. Cl.
  CPC ........... *G06V 20/52* (2022.01); *G06K 9/6249* (2013.01); *G06K 9/6267* (2013.01); *G06V 30/194* (2022.01); *H04N 5/23218* (2018.08)

(58) Field of Classification Search
  CPC . G06T 2207/10016; G06T 2207/10024; G06T 2207/20084; G06T 7/593; G06T 2207/30196; G06T 2207/10021; G06T 2207/20016; G06T 2207/20076; G06T 7/248; G06T 7/11; G06T 7/97; G06T 2207/10032; G06T 2207/10012; G06T 2207/20081; G06T 2207/30201; G06T 7/20; G06T 7/251; G06T 1/0021; G06T 1/0064; G06T 2201/0065; G06T 2207/30216; G06V 10/82; G06V 40/161; G06V 10/462; G06V 20/52; G06V 10/454; G06V 40/172; G06V 40/167; G06V 40/173; G06V 10/25; G06V 10/40; G06V 40/169; G06V 30/2504; G06V 10/147; G06V 20/40
  See application file for complete search history.

(56) References Cited

U.S. PATENT DOCUMENTS 8,213,707 B2   7/2012   Li et al.
8,825,306 B2   9/2014   Dankers
(Continued)

OTHER PUBLICATIONS

Liu et al., "Sparse Convolutional Neural Networks," 2015, CVF, IEEE (Year: 2015).*
(Continued)

*Primary Examiner* — Alex Kok S Liew
(74) *Attorney, Agent, or Firm* — F. Chau & Associates, LLC

(57) ABSTRACT

An image processing method including: capturing changes in a monitored scene; and performing a sparse feature calculation on the changes in the monitored scene to obtain a sparse feature map.

17 Claims, 9 Drawing Sheets

(51) Int. Cl.
  *G06K 9/62* (2022.01)
  *H04N 5/232* (2006.01)
  *G06V 30/194* (2022.01)

(56) References Cited

U.S. PATENT DOCUMENTS

| | | |
|---|---|---|
| 2017/0032536 A1 | 2/2017 | Lee et al. |
| 2017/0150235 A1* | 5/2017 | Mei .................. H04N 21/8405 |
| 2018/0005039 A1* | 1/2018 | Jachalsky .............. G06V 20/46 |
| 2018/0046916 A1 | 2/2018 | Dally et al. |
| 2018/0098082 A1 | 4/2018 | Burns et al. |
| 2018/0137647 A1 | 5/2018 | Li et al. |
| 2018/0137673 A1 | 5/2018 | Shi et al. |
| 2018/0150701 A1 | 5/2018 | Kang et al. |
| 2018/0336469 A1 | 11/2018 | O'Connor et al. |
| 2018/0357504 A1 | 12/2018 | Zamir et al. |

OTHER PUBLICATIONS

Ren et al., "SBNet: Sparse Blocks Network for Fast Inference", Uber Advanced Technologies Group, University of Toronto, Jun. 2018, 10 pages.

* cited by examiner

FIG. 5A
FIG. 5B
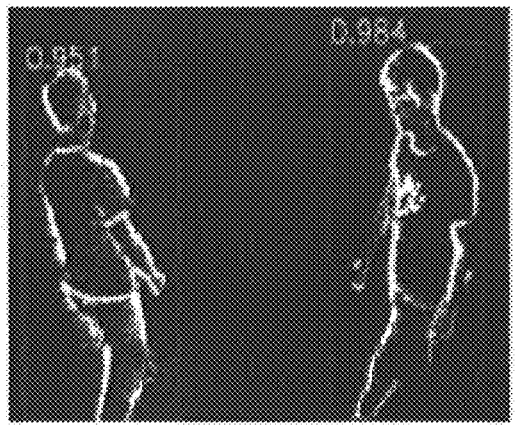
FIG. 6
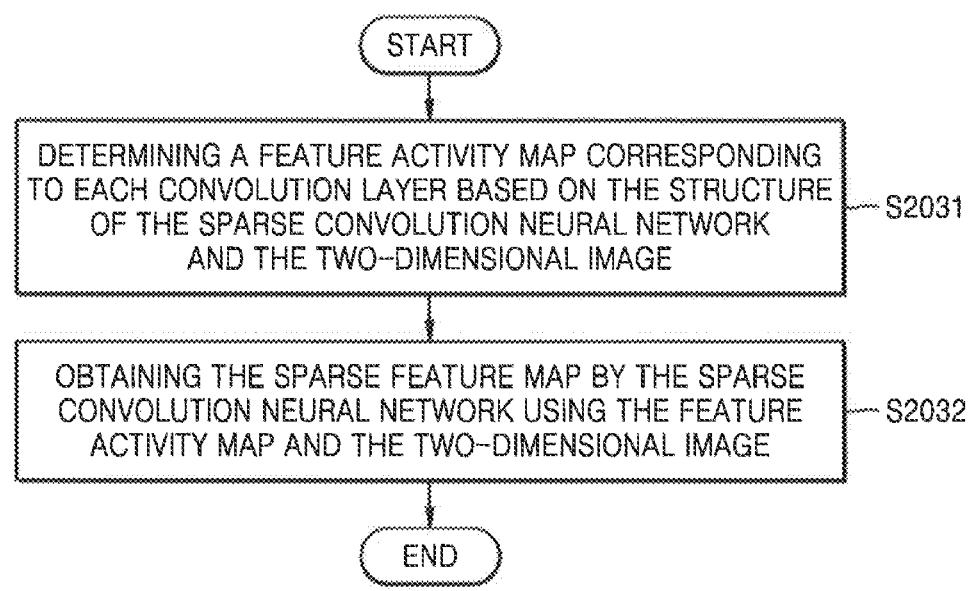

FIG. 10A
FIG. 10B
FIG. 10C
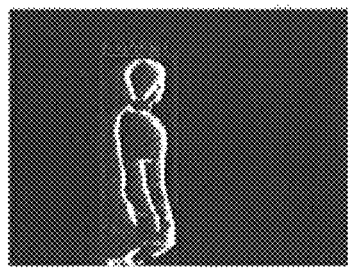
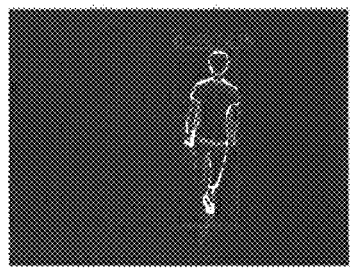
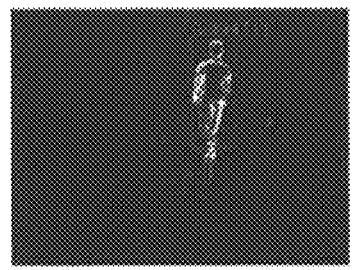
FIG. 10D
FIG. 10E
FIG. 10F
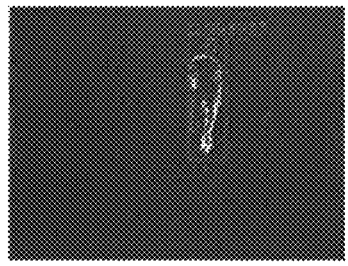
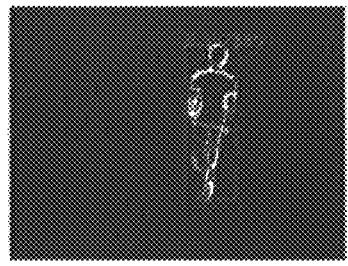
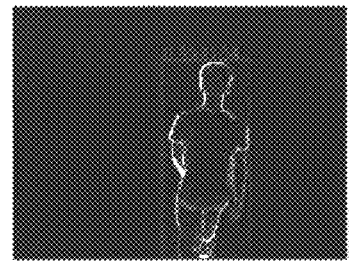

IMAGE PROCESSING METHOD, AN IMAGE PROCESSING APPARATUS, AND A SURVEILLANCE SYSTEM

CROSS-REFERENCE TO RELATED APPLICATION

This application claims priority under 35 U.S.C. § 119 to Chinese Patent Application No. 201910517273.6, filed on Jun. 14, 2019, in the Chinese Patent Office, the disclosure of which is incorporated by reference herein in its entirety.

TECHNICAL FIELD

The present inventive concept relates to video surveillance and artificial intelligence, and more particularly to an image processing method, an image processing apparatus, and a surveillance system.

DISCUSSION OF RELATED ART

Video surveillance is an integral part of a security system and typically includes front-end cameras, transmission medium and video surveillance platforms. Video surveillance is a comprehensive system with strong defense capabilities, and is widely used for its features of intuitively, accurately and timely providing information content. At present, video surveillance typically uses a frame imaging CMOS Image Sensor (CIS) camera, and its content analysis work is performed by the staff of the video surveillance platform for manual analysis.

Since security incidents such as theft, system down, or the like may occur at any time, the video surveillance system is in an open state for 24 hours a day every day. Such long operating periods cause the video surveillance system to take in a large amount of data. Taking video surveillance in Video Graphics Array (VGA) as an example, the uncompressed amount of data of an entire day can reach 74 GB. Analyzing and processing such massive data requires a large amount of computing resources, thereby limiting the application range of the video surveillance system.

When such large amounts of video data are monitored only by manual analysis, this consumes a lot of labor costs, but also leads to late or missed inspections due to the concentration limits of humans.

Artificial intelligence is a technical science that involves researching and developing theories, methods, techniques, and application systems for simulating, and extending person intelligence. Applying artificial intelligence technology to the video surveillance field can provide automatic video understanding, monitor and analysis functions, reduce the labor cost of the video surveillance platform, and expand the application range of the video surveillance.

A convolution neural network is an example algorithm of artificial intelligence in the field of vision, and is widely used in the field of video surveillance. A convolution neural network constructs a picture by imitating the visual perception mechanism of organisms, and traverses multiple times within the entire picture using a series of convolution kernels to extract high-dimensional features that can describe the content of the picture. However, due to the particularity of video surveillance, the convolution neural network needs to traverse all information in the surveillance video, thereby leading to massive consumption of computing resources.

Sparse convolution neural network is a type of convolution neural network. Compared with the traditional convolution neural network that traverses the whole picture, the sparse convolution neural network only calculates the region of the picture that contains valid information. An efficient sparse convolution neural network design can improve the performance of the video surveillance system.

In the existing sparse convolution neural network, it is determined whether a block is sparse based on the block, and a convolution calculation is performed based on a sparse block. For example, the input picture is first divided into a plurality of blocks, and it is judged whether the data in the blocks meets the standard of data validity. Then, the block containing the valid data is convoluted, and finally, the operation result is output. In the above method, selection, extraction and calculation are performed based on the sparse blocks, but there is still a large amount of sparseness in the blocks, therefore, the calculation amount is still large. In addition, there are overlapping regions between the blocks, which result in additional computational overhead.

Another technique is to make the calculation unit not process these invalid calculations by analyzing the sparseness of the input feature map of the convolution neural network or the sparseness of the convolution kernel. As shown in FIG. 1, the locations of the first non-zero weight vector and the original vector corresponding to the non-zero weight vector are received and the second non-zero activity vector and the original location of the non-zero activity vector are received. Then, the result of the non-zero weight vector and the non-zero weight activity vector is calculated by multiplication, e.g., the third vector, the location map relationship between the non-zero weight vector and the non-zero activity vector is organized to form a fourth vector, and the third vector is organized through the location map relationship contained in the fourth vector. This method of judging sparseness by input requires an additional calculation amount to analyze the sparseness of the input feature map and also requires a special computation platform to implement the above method.

As can be seen, a large amount of resources are wasted in the recording analysis of the static background.

SUMMARY

According to an exemplary embodiment of the present inventive concept, there is provided an image processing method including: capturing changes in a monitored scene; and performing a sparse feature calculation on the changes in the monitored scene to obtain a sparse feature map.

According to an exemplary embodiment of the present inventive concept, there is provided a surveillance system including: a front-end camera that captures changes in a monitored scene; and a processor that is configured to perform a sparse feature calculation on the changes in the monitored scene to obtain a sparse feature map.

According to an exemplary embodiment of the present inventive concept, there is provided an image processing apparatus including: a dynamic event information collection module that captures changes in a monitored scene; and a sparse feature map generation module that performs a sparse feature calculation on the changes in the monitored scene to obtain a sparse feature map.

BRIEF DESCRIPTION OF THE DRAWINGS

The above and other features of the present inventive concept will become more apparent by describing in detail exemplary embodiments thereof with reference to the accompanying drawings, in which:

FIGS. 5A and 5B illustrate a schematic diagram of a comparison of amounts of data of the conventional image processing method and the image processing method according to an exemplary embodiment of the present inventive concept;

FIG. 6 illustrates a flow chart of steps of obtaining a sparse feature map by a sparse convolution neural network, according to an exemplary embodiment of the present inventive concept;

FIGS. 10A, 10B, 10C, 10D, 10E and 10F illustrate schematic diagrams of an object moving in a monitored scene, according to an exemplary embodiment of the present inventive concept;

DETAILED DESCRIPTION OF THE EMBODIMENTS

Hereinafter, exemplary embodiments of the inventive concept will be described more fully with reference to the accompanying drawings.

Figure 1:
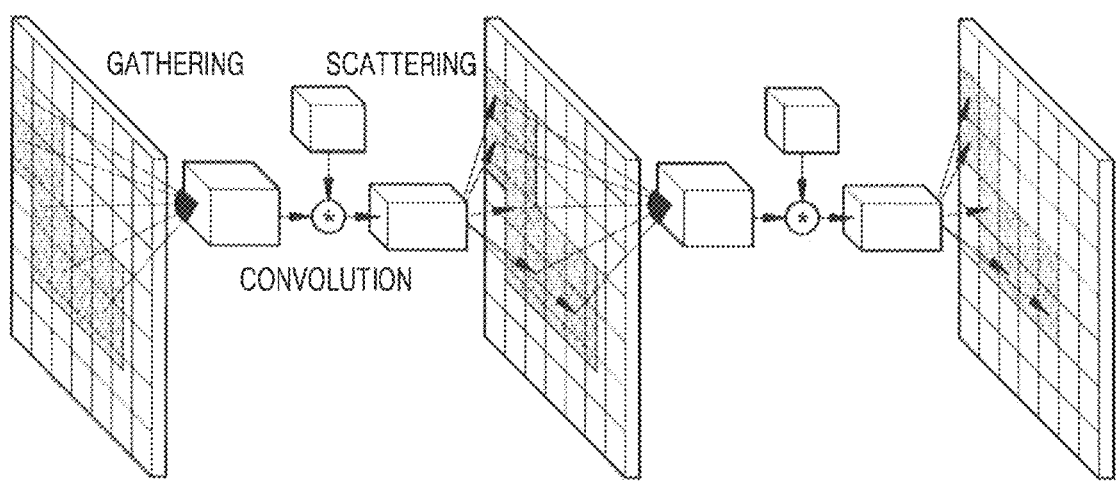
FIG. 1 illustrates a schematic diagram of a conventional block sparse convolution neural network.
Figure 2:
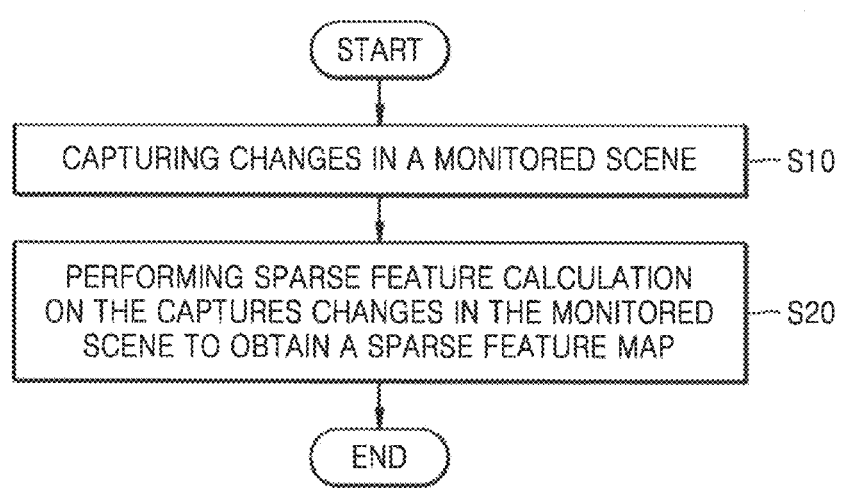
FIG. 2 illustrates a flow chart of an image processing method according to an exemplary embodiment of the present inventive concept.

FIG. 2 illustrates a flow chart of an image processing method according to an exemplary embodiment of the present inventive concept.

Referring to FIG. 2, in step S10, changes in a monitored scene are captured.

Since most of the regions in the monitored scene are static, only focusing on the changes in the monitored scene can reduce the amount of data that needs to be saved and analyzed.

In step S20, sparse feature calculation is performed on the captured changes in the monitored scene to obtain a sparse feature map.

In an exemplary embodiment of the present inventive concept, the changes in the scene can be monitored in real time, and when the scene changes, the sparse feature map is obtained based on the sparseness of the pixels, thereby increasing the processing speed of the image. The process of obtaining the sparse feature map based on the changes in the monitored scene is described in detail below with reference to FIG. 3.

Figure 3:
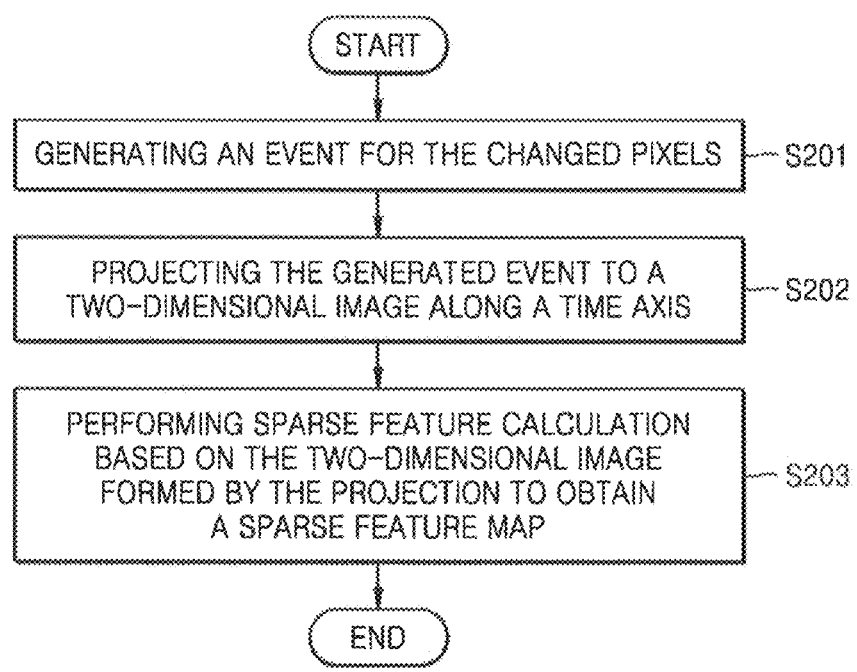
FIG. 3 illustrates a flow chart of steps of obtaining a sparse feature map according to an exemplary embodiment of the present inventive concept.

FIG. 3 illustrates a flow chart of steps of obtaining a sparse feature map, according to an exemplary embodiment of the present inventive concept.

Referring to FIG. 3, in step S201, a pixel-based event is generated when the changes in the monitored scene are captured.

For example, when the amount of change in the brightness value of any pixel in the scene image of the captured monitored scene is greater than a predetermined value, an event of the pixel is generated. As an example, the event may include a location at which the pixel is located, a time at which the event occurs, and a polarity of the pixel. Here, the polarity may indicate a change in the brightness value of the pixel, for example, the polarity of the pixel may indicate whether the change in the pixel corresponds to an increase in the brightness value or a decrease in the brightness value.

For example, the pixel-based event can be generated as follows.

In one case, the pixel-based event can be generated by capturing the changes in a monitored scene by an event camera.

Here, the event camera may be a camera capable of directly outputting an event, and as an example, the event camera may include, but is not limited to, a dynamic vision sensor and/or an asynchronous time-based image sensor.

Addressing the dynamic vision sensor (or DVS) as an example of the event camera, DVS is a new generation of vision sensor. Traditional vision sensors record images of a scene in units of frames, while DVS captures the changes in the scene and generates a series of events based on the changes. However, due to the influences of change in ambient light, the performance of the sensor itself, and the like, the events generated by DVS have characteristics such as high noise and small amounts (e.g., sparse), and events may also occur due to the flicker of some light sources.

In the dynamic vision sensor, for a single pixel, there will be an event (e.g., pulse) signal output only when the received light intensity changes. For example, if the brightness value increase of a pixel exceeds a predetermined value, an event in which the brightness of the pixel increases is generated.

In another case, a pixel-based event can be generated by performing frame difference processing on a frame image captured by an ordinary camera.

Here, the ordinary camera may be a conventional frame imaging camera. As an example, the ordinary camera may include, but is not limited to, a CMOS Image Sensor (CIS) camera based on frame imaging. The CIS camera determines whether the monitored scene changes by performing frame difference processing on the frame image captured thereby, and when it is determined that the monitored scene changes, the CIS camera generates the pixel-based event.

Alternatively, at least one of the cameras described above may be arranged at different locations in the monitored scene, and the cameras collect scene information of different monitoring ranges.

It should be understood that in the conventional sparse convolution neural network, it determines whether a region is sparse based on a block, and convolution calculation is performed based on a sparse block, however, in the above described processing process, the block mask still contains a large amount of sparseness, which results in a large amount of computation.

However, in an exemplary embodiment of the present inventive concept, when monitored scene changes are captured, one pixel corresponds to one event, and the event corresponding to the pixel is used for subsequent convolution processing. In other words, the convolution processing is performed based on the sparseness of the pixel, to achieve convolution acceleration using the sparseness at the pixel level.

In step S202, the generated event is projected to a two-dimensional image along a time axis.

Since the sensor captures the changes in all scenes at high speed and asynchronously, and generates a large number of events that are densely sampled on the time axis, processing these events one by one can consume a lot of computing resources. However, the event can be projected along the time axis to form the two-dimensional image, and subsequent processing is performed based on the two-dimensional image to reduce the amount of calculation.

For example, when the changes in the monitored scene are captured, an event is generated. With the passage of time, an event stream is formed, and the event stream is projected to a two-dimensional image plane in a time decay manner to generate the two-dimensional image.

As an example, the above-described process of projecting the event to the two-dimensional image along the time axis can be realized by an integral form in a mathematical expression. In this case, the two-dimensional image can be obtained by integrating the generated event on the time axis. For example, a spatial integral image, which is the two-dimensional image formed by projecting, is formed by integrating the event stream on the time axis.

The two-dimensional image can be obtained by performing the time decay integral for the generated event on the time axis.

In one example, an exponential decay integral is performed according to the difference between the time when the event occurs and the current time, and the pixel value of a pixel on the two-dimensional image at the current time can be calculated by the following equation:

$$I_{(x,y)} = 255 \times e^{(T_{last(x,y)} - T_{now})/\sigma} \quad (1)$$

In equation (1), $I_{(x,y)}$ is the pixel value of the pixel at the coordinate location (x,y) on the two-dimensional image. $T_{last(x,y)}$ is the time when the pixel appears at the coordinate location (x,y) (e.g., the time when the event occurs). $T_{now}$ is the current time. $\sigma$ is the proportional coefficient which is used for controlling the speed at which the event decays along the time axis.

In another example, a linear decay integral is performed according to the difference between the time when the event occurs and the current time, and the pixel value of a pixel on the two-dimensional image at the current time can be calculated by the following equation:

$$I_{(x,y)} = \frac{255 \times (T_{last(x,y)} - T_{start})}{(T_{now} - T_{last(x,y)})} \quad (2)$$

In equation. (2), $I_{(x,y)}$ is the pixel value of the pixel at the coordinate location (x,y) on the two-dimensional image. $T_{last(x,y)}$ is the time when the pixel appears at the coordinate location (x,y) (e.g., the time when the event occurs). $T_{start}$ is the start time of the statistical window. $T_{now}$ is the current time.

In other words, the earlier the time when the event occurs, the smaller the map value of the event projecting on the two-dimensional image (e.g., the smaller the pixel value obtained by calculation above). In addition, the later the time when the event occurs, the larger the map value of the event projecting on the two-dimensional image (e.g., the larger the pixel value obtained by calculation above).

Figure 4:
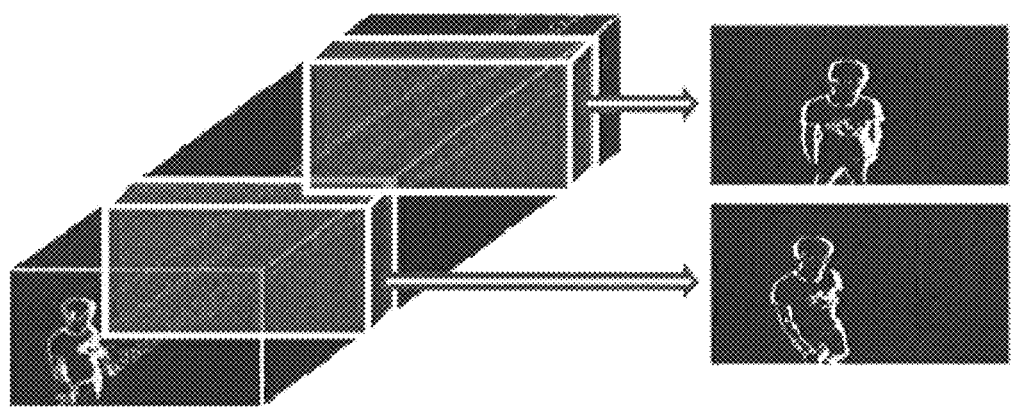
FIG. 4 illustrates a schematic diagram of generating a two-dimensional image according to an exemplary embodiment of the present inventive concept.

FIG. 4 illustrates a schematic diagram of generating a two-dimensional image, according to an exemplary embodiment of the present inventive concept.

In the example shown in FIG. 4, taking an event stream that is generated by capturing changes in a monitored scene by using a dynamic vision sensor as an example is shown. The left image of FIG. 4 is an event stream of the changes in the monitored scene captured by the dynamic vision sensor and the right image of FIG. 4 is a result image of projecting the captured event stream in a predetermined time period to a two-dimensional image plane.

When an object moves in the monitored scene, the dynamic vision sensor generates a series of event streams (as the left image in FIG. 4 shows), and by integrating the generated event stream on a time axis can form a spatial integral image (as the right image in FIG. 4 shows). The actual valid information (e.g., the information of the pixels that need to participate in the calculation) exists only in the non-zero region on the integral image, while the zero value region neither needs to be saved nor needs to participate in the subsequent processing calculation because it does not contain valid information.

When there is no object moving or no change in the monitored scene, the dynamic vision sensor does not image, and also not need to save data or perform computation and analysis. Therefore, the amount of data and the amount of calculation of the dynamic vision sensor are much lower than those of the conventional frame imaging sensor when there is only a single object moving or change in a small range in the monitored scene.

FIGS. 5A and 5B illustrate a schematic diagram of a comparison of an amount of data of the conventional image processing method and the image processing method according to an exemplary embodiment of the present inventive concept.

FIG. 5A shows an imaging result of the conventional CIS camera based on frame imaging, and FIG. 5B shows an integral imaging image based on a dynamic vision sensor in the same scene. It can be seen from the comparison of FIG. 5A and FIG. 5B, the video surveillance system based on the dynamic vision sensor does not capture a static background; therefore, the amount of data is much lower than that of the camera based on frame imaging.

The sensor used for monitoring reacts to the changes in a external scene, but due to its characteristic of high response speed and high dynamic range, a change in external light (for example, a power frequency flicker of the illumination source) can cause the sensor to generate a response event. In addition, the sensor also generates a sparse event due to internal noise. The event generated by the light source flicker or the internal noise, due to its strong regularity, can be separated from the collected events by a pre-processing method, and the separated event can be regarded as an event generated by an object motion.

In an exemplary embodiment of the present inventive concept, the two-dimensional image may be a two-dimensional image formed based on the event generated by the object motion.

For example, the event generated by the object motion can be obtained by filtering out events generated by light source flicker and/or by the internal noise of the camera for capturing the changes in the monitored scene from all generated events;

As an example, the event generated by the light source flicker may be filtered out from all events by a light source flicker detection algorithm, for example, by detecting the region of the flicker light source in the scene and filtering out all events in the region of the flicker light source by the light source flicker detection algorithm. In addition, the event generated by the internal noise of the camera for capturing changes in the monitored scene may be filtered out from all events by a scatter detection algorithm.

It should be understood that the step of filtering out interference described above may be performed after the step of generating an event (e.g., step S201) to perform projection using the event generated by the object motion for forming the two-dimensional image. However, the present inventive concept is not limited thereto, and the step of filtering out interference described above may be performed after the step of forming the two-dimensional image (e.g., step S202). Filtering out interference processing described above is performed on the two-dimensional image formed based on the projection of all events, and the two-dimensional image after the filtering out interference processing is the two-dimensional image formed based on the event generated by the object motion.

In other words, the filtering out interference processing described above can be performed on the generated event, and can also be performed on the two-dimensional image formed by the projection, thereby filtering out the events caused by the light source flicker and/or the internal noise of the sensor and obtaining the two-dimensional image formed based on the event generated by the object motion.

In an exemplary embodiment of the present inventive concept, the image processing method may further include: reconstructing texture of an object generating the event using a pixel-based event to obtain more detailed information of the object—this can make the edges of the object in a two-dimensional image more detailed.

Returning to step S203 in FIG. 3, sparse feature calculation is performed based on the two-dimensional image formed by projecting to obtain a sparse feature map.

In an exemplary embodiment of the present inventive concept, the sparse feature map can be obtained by performing sparse feature calculation based on the two-dimensional image by a sparse convolution neural network.

The steps of obtaining the sparse feature map by the sparse convolution neural network are described below with reference to FIG. 6.

FIG. 6 illustrates a flow chart of steps of obtaining a sparse feature map by a sparse convolution neural network, according to an exemplary embodiment of the present inventive concept.

Referring to FIG. 6, in step S2031, a feature activity map corresponding to each convolution layer of the sparse convolution neural network is determined based on the structure of the sparse convolution neural network and a two-dimensional image.

For example, the two-dimensional image can form a feature activity map of the underlying convolution. The scale adjustment is performed according to a receptive field of the sparse convolution neural network, and the feature activity map corresponding to each convolution layer of the sparse convolution neural network is obtained.

As an example, the feature activity map corresponding to a convolution layer may indicate a location of a pixel in the convolution layer that needs to participate in the calculation. When the scale adjustment is performed according to the receptive field of the sparse convolution neural network, the location of the event that exists in the receptive field can be set as an active state, which indicates that the pixel of the location needs to participate in the calculation, in the feature activity map, and the location of the event that does not exist in receptive field can be set as an inactive state, which indicates that the pixel of the location does not need to participate in the calculation, in the feature activity map.

Since the size of the feature map of the sparse convolution neural network decreases as the number of layers of convolution layers increases, the receptive field of the convolution kernel also expands as the number of layers of the convolution layers increases. Therefore, the feature activity map may also be adjusted according to the size of feature map of the sparse convolution neural network and the change of the receptive field of the convolution kernel to adapt to the different convolution layers, thereby ensuring the completeness of information.

In other words, the size of the feature activity map corresponding to a convolution layer is determined according to the size of an input feature map of the convolution layer of the sparse convolution neural network and the size of the receptive field of the convolution kernel.

In step S2032, the sparse feature map is obtained by the sparse convolution neural network using each of the determined feature activity maps and the two-dimensional image.

For example, the two-dimensional image can be used as the input feature map for the underlying convolution of the sparse convolution neural network, and an output feature map of a convolution layer in the sparse convolution neural network is the input feature map of a next convolution layer of the convolution layer. For the convolution layer, referring to the feature activity map of the convolution layer, which pixels on the input feature map need to participate in the calculation and which pixels do not need to participate in the calculation are selected, and convolution processing is performed on the pixels that need to participate in the calculation to output the sparse feature map.

In an exemplary embodiment of the present inventive concept, a corresponding feature activity map is determined for each convolution layer, and sparse information is extended to different convolution layers to reduce the computational cost of each convolution layer.

The process of obtaining the output feature map of any convolution layer in the sparse convolution neural network is described below with reference to FIGS. 7 and 8.

Figure 7:
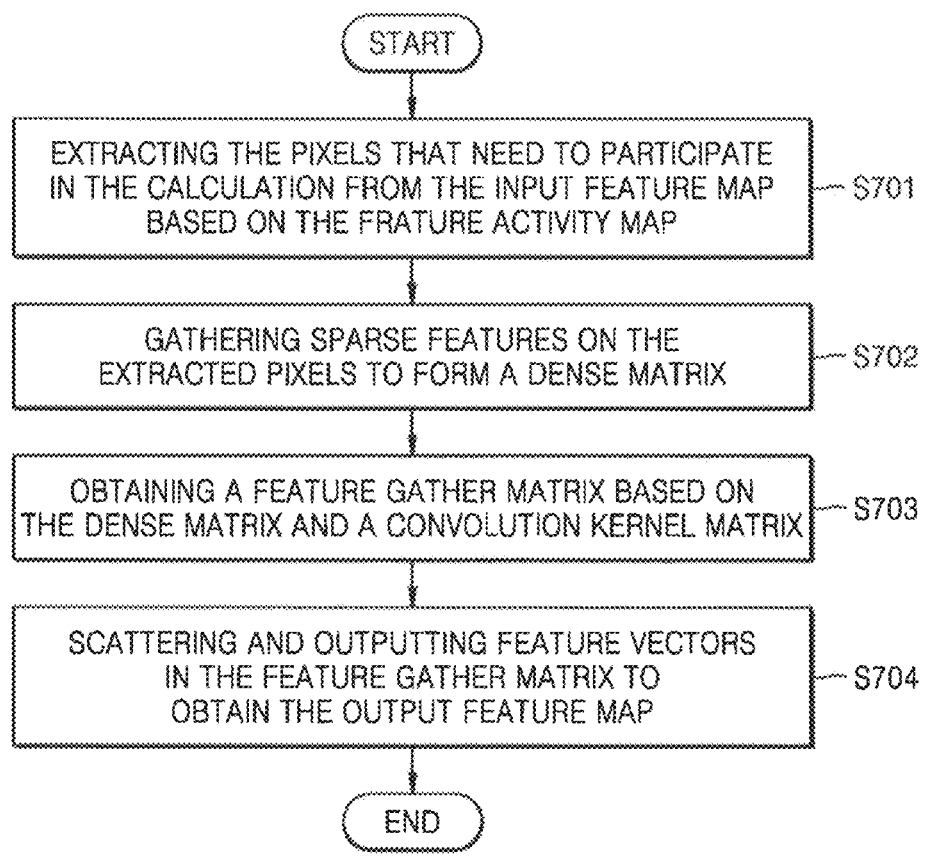
FIG. 7 illustrates a flow chart of steps of generating an output feature map corresponding to a convolution layer in a sparse convolution neural network, according to an exemplary embodiment of the present inventive concept.

FIG. 7 illustrates a flow chart of steps of generating an output feature map corresponding to a convolution layer in a sparse convolution neural network, according to an exemplary embodiment of the present inventive concept. FIG. 8 illustrates a schematic diagram of generating an output feature map corresponding to a convolution layer in a sparse convolution neural network, according to an exemplary embodiment of the present inventive concept.

Referring to FIG. 7, in step S701, the pixels that need to participate in the calculation are extracted from an input feature map of the convolution layer based on a feature activity map corresponding to the convolution layer.

Different from the conventional method that uses the input of current convolution layer to determine whether an operation is required, in the sparse convolution neural network of the exemplary embodiment of the present inventive concept, the sparseness of the output feature map of the convolution layer is constrained by the sparseness of the input feature map of a next convolution layer of the convolution layer, thereby memory can be organized efficiently.

Figure 8:
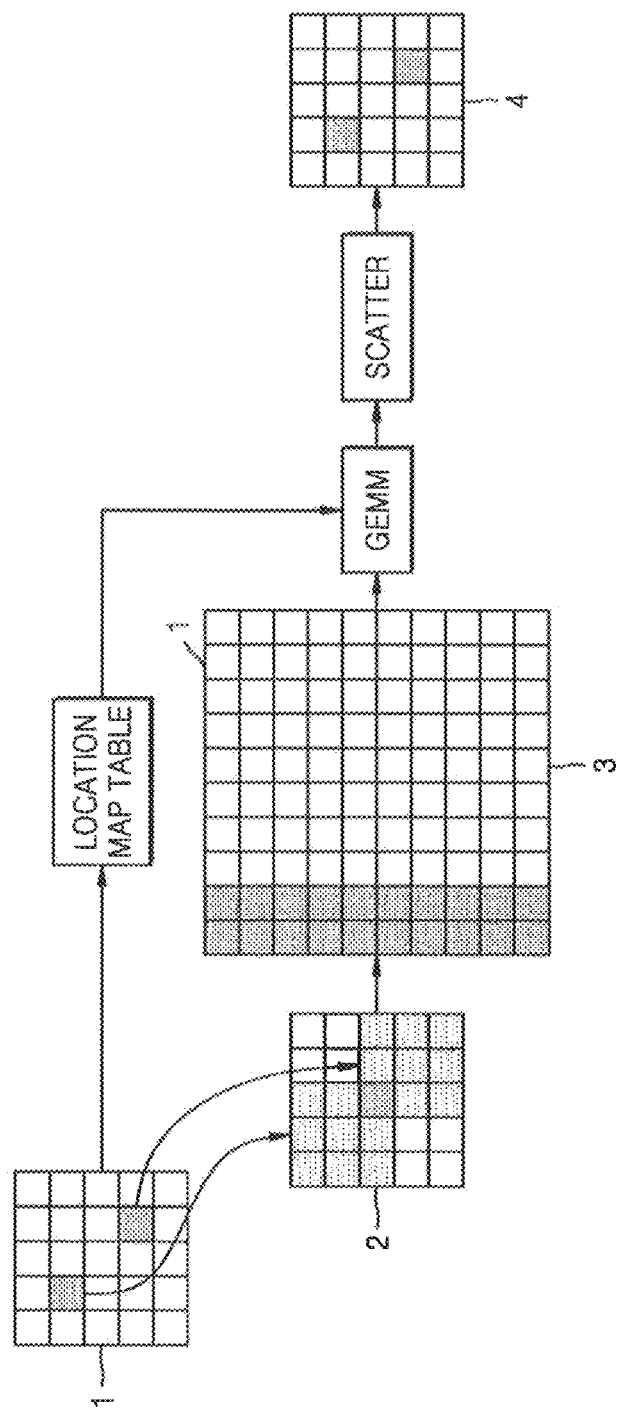
FIG. 8 illustrates a schematic diagram of generating an output feature map corresponding to a convolution layer in a sparse convolution neural network, according to an exemplary embodiment of the present inventive concept.

Referring to the example shown in FIG. 8, 1 is the feature activity map corresponding to the convolution layer, and the points shown in the feature activity map are the locations of the pixels that need to participate in the calculation. 2 is the input feature map of the convolution layer, which shows the region covered by the location shown in the feature activity map.

In step S702, gathering sparse features is performed on the extracted pixels to form a dense matrix 3.

Referring to the example shown in FIG. 8, the extracted pixels may be arranged in a column to form the dense matrix 3.

In the gathering sparse feature process described above, a location map table between pixels extracted from the input feature map of the convolution layer and data in the dense matrix 3 is also generated.

In step S703, a feature gather matrix is obtained based on the formed dense matrix 3 and a convolution kernel matrix corresponding to the convolution layer.

For example, the formed dense matrix 3 may be matrix-multiplied with the convolution kernel matrix corresponding to the convolution layer to obtain the feature gather matrix.

As an example, the conventional general matrix multiplication (GEMM in FIG. 8) may be used to operate on the dense matrix 3 and the convolution kernel matrix, but the inventive concept is not limited thereto, and other methods may be used for gathering.

In step S704, feature vectors in the obtained feature gather matrix are scattered (SCATTER in FIG. 8) and outputted to obtain the output feature map 4 of the convolution layer.

For example, feature vectors in the feature gather matrix may be mapped to an image space based on the generated location map table above to obtain the output feature map 4 of the convolution layer. The different columns in the feature gather matrix correspond to different output locations on the output feature map 4. Other locations can be filled with fixed values when outputting, for example, assigning a value of zero, a fixed offset value (Bias), or implementing other locations by the ground state.

In the above process of obtaining the output feature map 4, the activity location of the event is calculated based on the sparseness of the pixel, and the processing acceleration is realized. In an exemplary embodiment of the present inventive concept, the sparseness of sensor input is used to directly accelerate without analyzing the sparseness of the input of each layer of the sparse convolution neural network.

It should be understood that the cause of the changes in a scene may be analyzed based on the sparse feature map after obtaining the sparse feature map by the above manner.

In an exemplary embodiment of the present inventive concept, the sparse feature map obtained at the current time may be fused with a historical sparse feature map to analyze the cause of the changes in the scene based on the fused sparse feature map. Here, the historical sparse feature map may be at least one sparse feature map obtained before the current time, in other words, the analysis of the changes in the scene is performed using the fusion result of the sparse feature maps obtained at multiple points in time.

Here, various fusion methods can be used to fuse the sparse feature map with the historical sparse feature map. As an example, the sparse feature map and the historical sparse feature map may be fused using long-short term memory recurrent neural network. However, the present inventive concept is not limited thereto, and other methods may be used for fusion.

The steps of performing the analysis of the changes in a scene based on the sparse feature map are described below with reference to FIG. 9.

Figure 9:
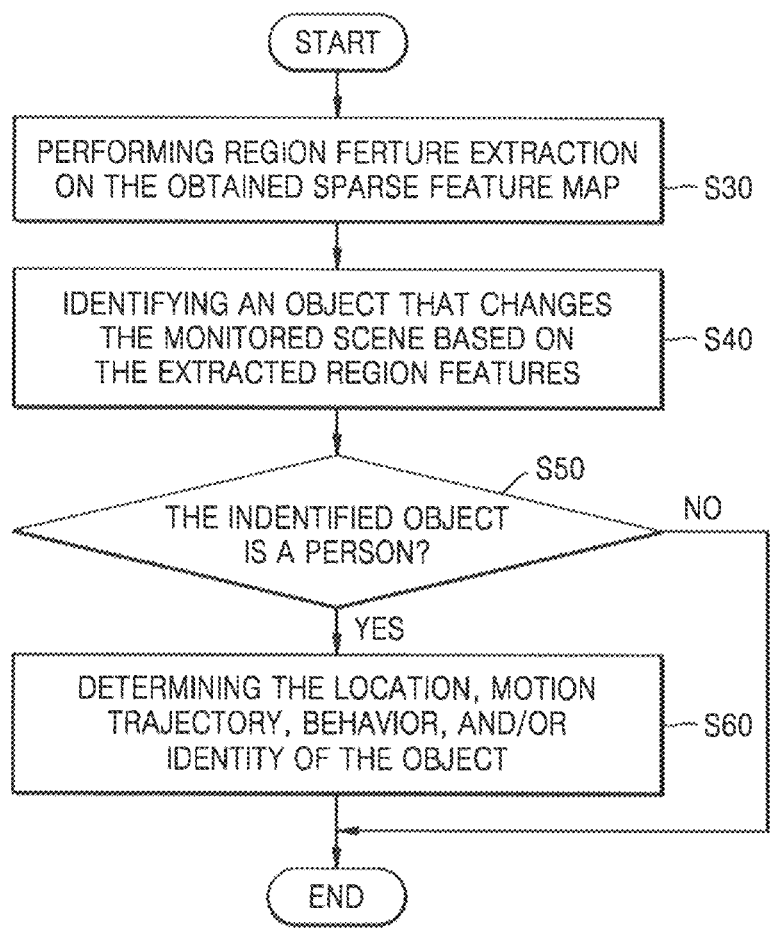
FIG. 9 illustrates a flow chart of steps of performing scene change analysis based on a sparse feature map, according to an exemplary embodiment of the present inventive concept.

FIG. 9 illustrates a flow chart of steps of performing the analysis of changes in a scene based on a sparse feature map, according to an exemplary embodiment of the present inventive concept.

Referring to FIG. 9, in step S30, region feature extraction is performed on the obtained sparse feature map.

For the case where the sparse feature map and a historical sparse feature map are fused, the region feature extraction may be performed on the fused sparse feature map in step S30.

As an example, the region feature may be extracted using a Region of Interest (ROI) technique, but the present inventive concept is not limited thereto, and other feature extraction methods may be used to extract the region feature.

In step S40, an object that changes the monitored scene is identified based on the extracted region features.

Here, various methods can be used to identify, whether the object that changes the monitored scene is a person or something other than a person based on the region features.

In step S50, it is determined whether the identified object is a person.

If the identified object is a person, step S60 is performed, i.e., determining the location, motion trajectory, behavior, and/or identity of the object.

Here, various feature map classification or regression algorithms may be used to determine the location, motion trajectory, behavior, and/or identity of the object.

In an exemplary embodiment of the present inventive concept, character recognition according to an event stream may be implemented based on sparse convolution of an event.

If the identified object is not person, other processing may be performed or step S60 is not performed.

The labor cost, the amount of data, and the amount of calculation of the surveillance system can be effectively reduced through the above image processing method, which is beneficial to a large-scale deployment of the video surveillance system.

In an exemplary embodiment of the present inventive concept, the above recognition result can also be used as a trigger basis for other sensors to reduce the amount of calculation and save cost.

For example, when the identified object is person, an ordinary camera for capturing a frame image can be triggered to take a picture the object. In other words, when it is determined that the cause of the change in the monitored scene is the presence of a person's movement, a CIS camera capable of acquiring more detailed image information may be triggered for taking.

For the case where a plurality of cameras are arranged at different locations in the monitored scene, since the relative location of each camera is known, the distance of the moving object from each camera, the location of the moving object in the image, and the three-dimensional location of the moving object in the scene can also be calculated.

Here, the above distance and location may be obtained by using the conventional various distance/location calculation methods, which will not be described in detail in the present disclosure.

FIGS. 10A through 10F illustrate schematic diagrams of an object moving in a monitored scene, according to an exemplary embodiment of the present inventive concept.

In this example, a person in the scene walks away from the lens and approaches the lens backwards. In chronological order, two-dimensional images are arranged as shown 10A to 10F.

Figure 11:
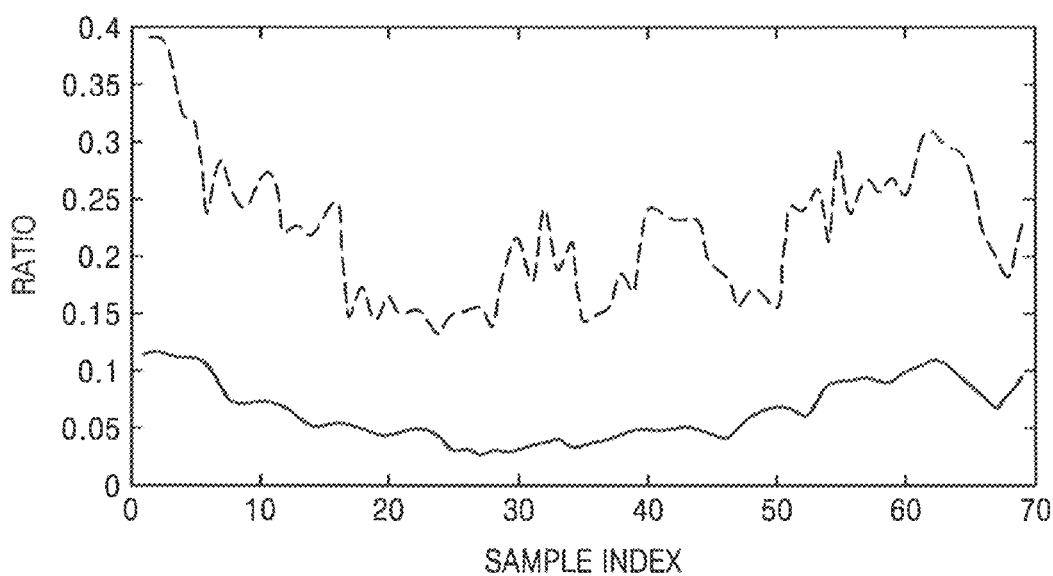
FIG. 11 illustrates schematic diagrams of a comparison of the amount of data and a comparison of operation efficiency of the conventional image processing method and the image processing method according to an exemplary embodiment of the present inventive concept.

FIG. 11 illustrates schematic diagrams of a comparison of the amount of data and a comparison of operation efficiency of the conventional image processing method and the image processing method according to an exemplary embodiment of the present inventive concept.

As shown in FIG. 11, the solid line shows the degree of sparseness ratio of a dynamic visual sensor (DVS), and the broken line shows the speedup between the sparseness of a first convolution layer in a sparse convolution neural network and a dense convolution for the object movement example shown in FIGS. 10A to 10F. It can be seen from FIG. 11 that the amount of data and the amount of calculation of the image processing method of the present inventive concept are lower than those of the conventional art.

Figure 12:
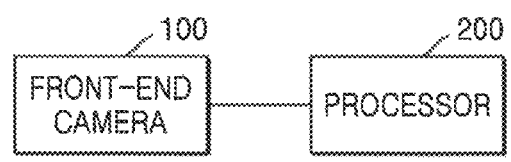
FIG. 12 illustrates a block diagram of a surveillance system according to an exemplary embodiment of the present inventive concept.

FIG. 12 illustrates a block diagram of a surveillance system according to an exemplary embodiment of the present inventive concept.

As shown in FIG. 12, the surveillance system according to the present embodiment includes a front-end camera 100 and a processor 200. Here, data interaction may be performed by using various transmission mediums between the front-end camera 100 and the processor 200.

In particular, the front-end camera 100 captures changes in a monitored scene. The processor 200 is configured to perform sparse feature calculation on the captured changes in the monitored scene to obtain a sparse feature map.

For example, the processor 200 may project a pixel-based event generated by capturing the changes in the monitored scene along a time axis, and perform sparse feature calculation based on a two-dimensional image formed by the projecting to obtain the sparse feature map.

As an example, the event may include location coordinates at which the pixel is located, a time at which the event occurs, and a polarity of the pixel. Here, the polarity may indicate a change in the brightness value of the pixel. For example, the polarity of the pixel may indicate whether the change in the pixel is an increase in the brightness value or a decrease in the brightness value. The pixel-based event can be generated in the following manner.

The front-end camera 100 may include an event camera for directly outputting an event and/or an ordinary camera for capturing a frame image.

In one case, the event camera generates the pixel-based event when capturing the changes in the monitored scene.

Here, the event camera may be a camera capable of directly outputting an event, and as an example, the event camera may include, but is not limited to, a dynamic vision sensor and/or an asynchronous time-based image sensor.

In another case, the ordinary camera can capture the frame image of the monitored scene, and the processor 200 generates the pixel-based event by performing frame difference processing on the frame image captured by the ordinary camera.

The process in which processor 200 projects based on the event to form the two-dimensional image is described below.

Here, when the front-end camera 100 captures the changes in the monitored scene, an event is generated. With the passage of time, an event stream is formed, and the processor 200 projects the event stream to the two-dimensional image plane in a time decay manner to generate the two-dimensional image.

The earlier the time when the event occurs, the smaller the map value of the event projecting on the two-dimensional image, and the later the time when the event occurs, the larger the map value of the event projecting on the two-dimensional image.

For example, processor 200 may obtain the two-dimensional image by performing a time decay integral the generated event on the time axis.

In an exemplary embodiment of the present inventive concept, the two-dimensional image may be a two-dimensional image formed based on the event generated by the object motion.

For example, the processor 200 may obtain an event generated by object motion by filtering out events generated by light source flicker and/or by internal noise of the front-end camera 100 for capturing changes in the monitored scene from all generated events.

As an example, the processor 200 may filter out the events generated by the light source flicker from all events by a light source flicker detection algorithm, and/or may filter out the events generated by the internal noise of the front-end camera 100 for capturing changes in the monitored scene from all events by a scatter detection algorithm.

In an exemplary embodiment of the present inventive concept, the processor 200 also reconstructs the texture of the object generating the event using the pixel-based event to obtain more detailed information of the object, which can make the edges of the object in the two-dimensional image more detailed.

For example, the processor 200 may perform a sparse feature calculation based on the two-dimensional image by using a sparse convolution neural network to obtain a sparse feature map.

Specifically, the processor 200 may determine a feature activity map corresponding to each convolution layer of the sparse convolution neural network based on the structure of the sparse convolution neural network and the two-dimensional image, and obtain the sparse feature map by the sparse convolution neural network using each of the feature activity maps and the two-dimensional image.

For example, the two-dimensional image may form the feature activity map of an underlying convolution, and the processor 200 performs a scale adjustment according to a receptive field of the sparse convolution neural network to obtain the feature activity map corresponding to each convolution layer of the sparse convolution neural network.

As an example, the feature activity map corresponding to a convolution layer indicates a location of a pixel in the convolution layer that needs to participate in the calculation. The size of the feature activity map corresponding to the convolution layer is determined according to the size of the input feature map of the convolution layer of the sparse convolution neural network and the size of the receptive field of the convolution kernel.

In the sparse convolution neural network of the present inventive concept, the sparseness of an output feature map of the convolution layer is constrained by the sparseness of the input feature map of a next convolution layer of the convolution layer.

The processor 200 can obtain the output feature map of the convolution layer in the sparse convolution neural network by the following manner.

Extracting pixels that need to participate in the calculation from the input feature map of the convolution layer based on the feature activity map corresponding to the convolution layer; performing gathering sparse features on the extracted pixels to form a dense matrix; obtaining a feature gather matrix according to the formed dense matrix and a convolution kernel matrix corresponding to the convolution layer; and scattering and outputting feature vectors in the obtained feature gather matrix to obtain the output feature map of the convolution layer.

For example, processor 200 also generates a location map table between pixels extracted from the input feature map of the convolution layer and data in the dense matrix. In this case, the processor 200 maps the feature vectors in the feature gather matrix based on the location map table to obtain the output feature map of the convolution layer.

In an exemplary embodiment of the present inventive concept, the processor 200 may analyze the cause of the changes in the monitored scene based on the obtained sparse feature map after obtaining the sparse feature map.

In an exemplary embodiment of the present inventive concept, the processor 200 may fuse the sparse feature map obtained at the current time with a historical sparse feature map, and analyze the cause of the changes in the scene based on the fused sparse feature map.

As an example, the processor 200 may fuse the sparse feature map with the historical sparse feature map using a long-short term memory recurrent neural network.

Specifically, the processor 200 may be further configured to perform region feature extraction on the obtained sparse feature map, identify an object that changes the monitored scene based on the extracted region features, and determine location, motion trajectory, behavior, and/or identity of the object if the identified object is a person. If the identified object is not person, the processor 200 may not process the object.

For the case where the sparse feature map and the historical sparse feature map are fused, the processor 200 may perform region feature extraction on the fused sparse feature map.

For the case where the front-end camera 100 includes an event camera for directly outputting an event and an ordinary camera for capturing a frame image, the event camera can be used for capturing the changes in the monitored scene, and when the processor 200 identifies that the object is a person, the processor 200 can trigger the ordinary camera to record the image or the video data of the object for further analysis of the object.

Figure 13:
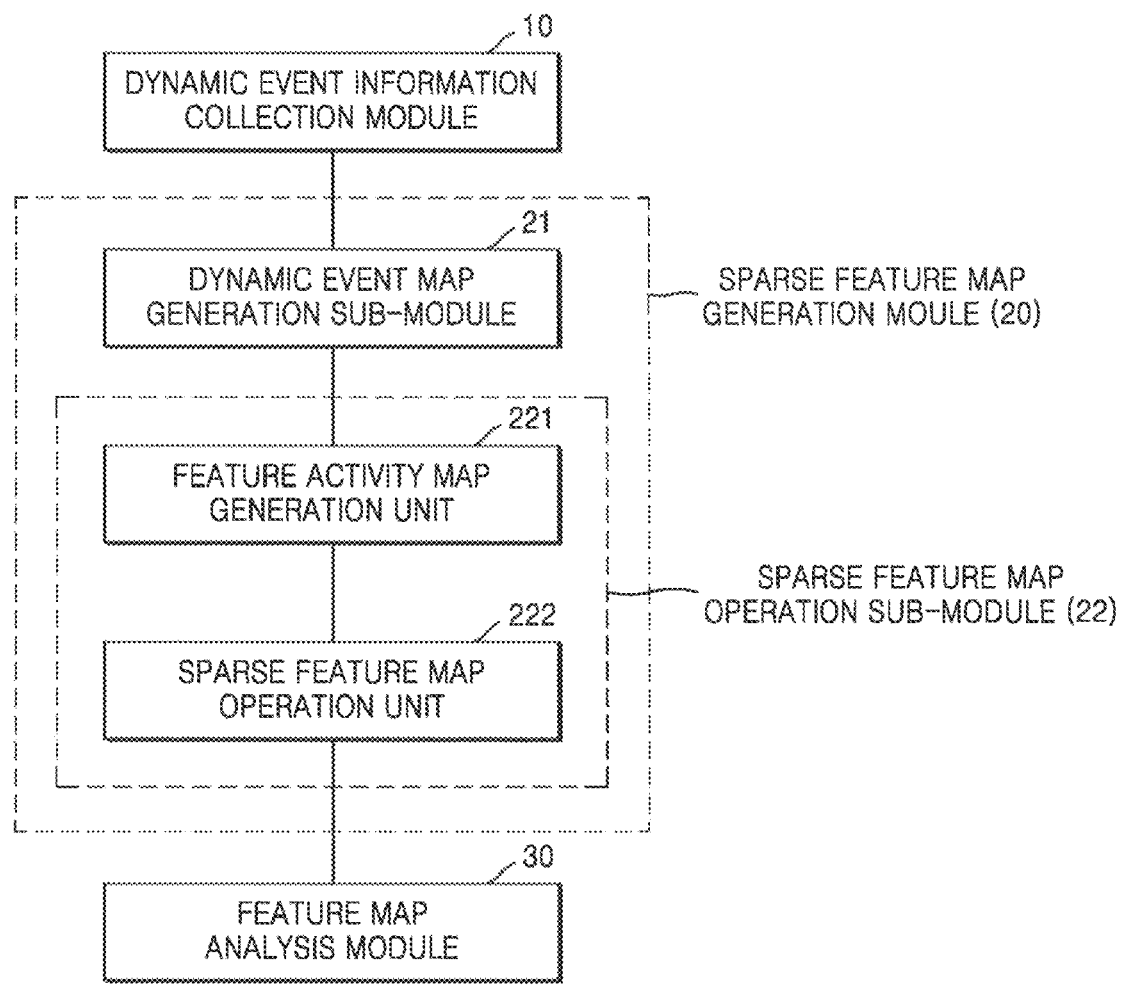
FIG. 13 illustrates a block diagram of an image processing apparatus according to an exemplary embodiment of the present inventive concept.

FIG. 13 illustrates a block diagram of an image processing apparatus according to an exemplary embodiment of the present inventive concept.

As shown in FIG. 13, an image processing apparatus according to the present embodiment includes a dynamic event information collection module 10 and a sparse feature map generation module 20. It should be understood that these modules may be implemented by a general-purpose hardware processor such as a digital signal processor, a field programmable gate array, and so on. In addition, these modules may be implemented by a dedicated hardware processor such as a dedicated chip, and so on. In addition, these modules may be implemented in a software manner by a computer program and, for example, may be implemented as each module in the processor 200 shown in FIG. 12.

For example, the dynamic event information collection module 10 captures changes in a monitored scene.

The sparse feature map generation module 20 performs sparse feature calculation on the captured changes in the monitored scene to obtain a sparse feature map.

The sparse feature map generation module 20 according to the present embodiment may include a dynamic event map generation sub-module 21 and a sparse feature map operation sub-module 22.

For example, the dynamic event map generation sub-module 21 may project a pixel-based event generated by capturing the changes in the monitored scene along a time axis to form a two-dimensional image.

As an example, the event may include a location at which the pixel is located, a time at which the event occurs, and a polarity of the pixel. Here, the polarity may indicate a change in the brightness value of the pixel, for example, the polarity of the pixel may indicate whether the change in the pixel is an increase in the brightness value or a decrease in the brightness value.

The pixel-based events can be generated as follows.

In one example case, the dynamic event information collection module 10 can acquire the pixel-based event when capturing the changes in the monitored scene.

For example, the changes in the monitored scene are captured by using an event camera, and the dynamic event information collection module 10 acquires the pixel-based events from the event camera.

In another example case, the sparse feature map generation module 20 according to the present embodiment may further include a frame difference processing sub-module.

In this case, a frame image of the monitored scene is captured by an ordinary camera, and the dynamic event information collection module 10 acquires the frame image from the ordinary camera, and the frame difference processing sub-module generates the pixel-based event by performing the frame difference processing on the captured frame image of the monitored scene.

The process of the dynamic event map generation sub-module 21 forming the two-dimensional image is described below.

Here, when the changes in the monitored scene are captured, an event is generated, and with the passage of time, an event stream is formed. The dynamic event map generation sub-module 21 projects the event stream to a two-dimensional image plane in a time decay manner to generate the two-dimensional image.

The earlier the time when the event occurs, the smaller the map value of the event projecting on the two-dimensional image, and the later the time when the event occurs, and the larger the map value of the event projecting on the two-dimensional image.

In an exemplary embodiment of the present inventive concept, the sparse feature map generation module 20 may further include a dynamic event pre-processing sub-module that obtains the event generated by the object motion by filtering out events generated by the light source flicker and/or by internal noise of the camera for capturing changes in the monitored scene from all generated events.

In this case, the dynamic event map generation sub-module 21 may form the two-dimensional image based on the event generated by the object motion.

In an exemplary embodiment of the present inventive concept, the sparse feature map generation module 20 can further include a texture reconstruction sub-module that reconstructs the texture of the object generating the event by using the pixel-based event.

The sparse feature map operation sub-module 22 may perform a sparse feature calculation based on the two-dimensional image formed by the projection to obtain the sparse feature map.

For example, the sparse feature map operation sub-module 22 can perform a sparse feature calculation based on the two-dimensional image by using a sparse convolution neural network to obtain the sparse feature map. The process of obtaining the sparse feature map based on the sparse convolution neural network by the sparse feature map operation sub-module 22 is described below.

For example, the sparse feature map operation sub-module 22 according to the present embodiment may include a feature activity map generation unit 221 and a sparse feature map operation unit 222.

For example, the feature activity map generation unit 221 determines a feature activity map corresponding to each convolution layer of the sparse convolution neural network based on the structure of the sparse convolution neural network and the two-dimensional image.

For example, the two-dimensional image may form a feature activity map of an underlying convolution, and the feature activity map generation unit 221 performs a scale adjustment according to a receptive field of the sparse convolution neural network to obtain the feature activity map corresponding to each convolution layer of the sparse convolution neural network.

As an example, the feature activity map corresponding to a convolution layer indicates a location of a pixel in the convolution layer that needs to participate in the calculation. The size of the feature activity map corresponding to the convolution layer is determined according to the size of an input feature map of the convolution layer of the sparse convolution neural network and the size of the receptive field of a convolution kernel.

The sparse feature map operation unit 222 obtains the sparse feature map by the sparse convolution neural network using each feature activity map and the two-dimensional image.

For example, in the sparse convolution neural network of the present invention, the sparseness of an output feature map of the convolution layer is constrained by the sparseness of the input feature map of a next convolution layer of the convolution layer.

For example, the sparse feature map operation unit 222 can obtain the output feature map of the convolution layer in the sparse convolution neural network by the following manner.

Extracting pixels that need to participate in the calculation from the input feature map of the convolution layer based on the feature activity map corresponding to the convolution layer; performing gathering sparse features on the extracted pixels to form a dense matrix; obtaining a feature gather matrix according to the formed dense matrix and the convolution kernel matrix corresponding to the convolution layer; scattering and outputting feature vectors in the obtained feature gather matrix to obtain the output feature map of the convolution layer.

For example, the sparse feature map operation unit 222 also generates a location map table between pixels extracted from the input feature map of the convolution layer and data in the dense matrix. In this case, the sparse feature map operation unit 222 may map the feature vectors in the feature gather matrix based on the location map table to obtain the output feature map of the convolution layer.

In an exemplary embodiment of the present inventive concept, after obtaining the sparse feature map, the cause of the change in the monitored scene may also be analyzed based on the obtained sparse feature map.

In this case, the image processing apparatus according to the present embodiment may further include a feature map analysis module 30 that performs region feature extraction on the obtained sparse feature map, identifies the object that changes the monitored scene based on the extracted region features, and determines the location, motion trajectory, behavior, and/or identity of the object if the identified object is a person.

The image processing apparatus according to the present embodiment may further include a fusion module that fuses the sparse feature map obtained at the current time with a historical sparse feature map, in which case the feature map analysis module 30 performs region feature extraction on the fused sparse feature map.

As an example, the fusion module may fuse the sparse feature map with the historical sparse feature map using a long-short term memory recurrent neural network.

For the case where the event camera for directly outputting the event and the ordinary camera for capturing the frame image are set in the monitored scene, when the object is identified as a person, the feature map analysis module 30 generates and outputs a taking trigger signal for triggering the ordinary camera to capture the frame image including the object.

A computer-readable storage medium for storing a computer program is also provided according to an exemplary embodiment of the present inventive concept. The computer-readable storage medium stores a computer program that, when executed by a processor, causes the processor to perform the image processing method described above. The computer-readable recording medium is any data storage device that can store data read by a computer system. Examples of the computer-readable recording medium include a read only memory, a random access memory, a read-only optical disk, a magnetic tape, a floppy disk, an optical data storage device, and a carrier wave (such as data transmission via the Internet via a wired or wireless transmission path).

By adopting the image processing method, the image processing apparatus, and the surveillance system according to exemplary embodiments of the present inventive concept, and utilizing the sparseness of the sensor for acceleration, the monitoring scene is optimized, and the amount of data and the amount of calculation are also reduced.

Further, by adopting the image processing method, the image processing apparatus, and the surveillance system according to exemplary embodiments of the present inventive concept, it is possible to quickly, accurately, and automatically analyze the cause of the change in the monitored scene based on the changes in the monitored scene.

Further, by adopting the image processing method, the image processing apparatus, and the surveillance system according to exemplary embodiments of the present inventive concept, introducing the sparse convolution neural network into the scene understanding based on scene change, optimizing the sparse convolution method for the characteristics of the sensor, and only calculating a more effective activity location by using the feature activity map, the amount of operation and the amount of calculation of image processing are effectively reduced.

Although the present inventive concept has been particularly shown and described with reference to the exemplary embodiments thereof, it will be understood by those skilled in the art that various changes in form and details may be made thereto without departing from the spirit and scope of the present inventive concept as set forth by the claims.

What is claimed is:

1. An image processing method, comprising:
capturing changes in a monitored scene using a dynamic vision sensor; and
performing a sparse feature calculation on the changes in the monitored scene to obtain a sparse feature map by a sparse convolution neural network,
wherein performing the sparse feature calculation comprises:
generating a pixel-based event when the changes in the monitored scene are captured;
projecting the generated pixel-based event along a time axis and integrating the generated pixel-based event to form a two-dimensional image, and
performing the sparse feature calculation based on the two dimensional image.

2. The image processing method of claim 1, wherein generating the pixel-based event comprises:
capturing the changes in the monitored scene by a first camera to generate the pixel-based event,
or, generating the pixel-based event by performing frame difference processing on a frame image captured by a second camera.

3. The image processing method of claim 1, wherein a texture of an object generating the pixel-based event is reconstructed using the pixel-based event.

4. The image processing method of claim 1, wherein the Wo-dimensional image is formed based on an event generated by object motion,
wherein the event generated by the object motion is obtained by filtering out events generated by light source flicker and by internal noise of a camera for capturing the changes in the monitored scene.

5. The image processing method of claim 1, wherein performing the sparse feature calculation comprises:
obtaining the sparse feature map by performing the sparse feature calculation based on the two-dimensional image by the sparse convolution neural network.

6. The image processing method of claim 5, wherein obtaining the sparse feature map by performing the sparse feature calculation based on the two-dimensional image by the sparse convolution neural network comprises:
determining a feature activity map corresponding to each convolution layer of the sparse convolution neural network based on the structure of the sparse convolution neural network and the two-dimensional image; and
obtaining the sparse feature map by the sparse convolution neural network using each feature activity map and the two-dimensional image.

7. The image processing method of claim 1, wherein the image processing method further comprises:
performing region feature extraction on the sparse feature map;
identifying an object that changes the monitored scene based on extracted region features; and
determining a location, motion trajectory, behavior, or identity of the object if the identified object is a person.

8. A surveillance system, comprising:
a front-end camera that captures changes in a monitored scene in real time using a dynamic vision sensor; and
a processor that is configured to perform a sparse feature calculation on the changes in the monitored scene to obtain a sparse feature map using a sparse convolution neural network,
wherein the processor projects a pixel-based event generated by capturing the changes in the monitored scene along a time axis, integrates the pixel-based event to form a two-dimensional image and performs the sparse feature calculation based on the two-dimensional image.

9. The surveillance system of claim 8 wherein the processor is further configured to:
perform a region feature extraction on the sparse feature map;
identify an object that changes the monitored scene based on extracted region features; and
determine a location, motion trajectory, behavior, or identity of the object if the identified object is a person.

10. An image processing apparatus, comprising:
a dynamic event information collection module, that captures changes in a monitored scene; and
a sparse feature map generation module that performs a sparse feature calculation on the changes in the monitored scene to obtain a sparse feature map using a sparse convolution neural network,
wherein the sparse feature map generation module comprises;
a dynamic event map generation sub-module that projects a pixel-based event generated by capturing the changes in the monitored scene along a time axis and integrates the pixel-based event to form a two-dimensional image; and
a sparse feature map operation sub-module that performs the sparse feature calculation based on the two-dimensional image.

11. The image processing apparatus of claim 10, wherein, the dynamic event information collection module generates the pixel-based event when capturing the changes in the monitored scene,
or, the sparse feature map generation module further includes a frame difference processing sub-module that generates the pixel-based event by performing a frame difference processing on the captured frame image of the monitored scene.

12. The image processing apparatus of claim 10, wherein the sparse feature map generation module further comprises a texture reconstruction sub-module that reconstructs a texture of an object generating the pixel-based event using the pixel-based event.

13. The image processing apparatus of claim 10, wherein the sparse feature map generation module further comprises a dynamic event pre-processing sub-module that obtains an event generated by object motion by filtering out events generated by light source flicker or by internal noise of a camera for capturing the changes in the monitored scene,
wherein the dynamic event map generation sub-module forms the two-dimensional image based on the event generated by the object motion.

14. The image processing apparatus of claim 10, wherein the sparse feature map operation sub-module performs a sparse feature calculation based on the two-dimensional image to obtain the sparse feature map by using the sparse convolution neural network.

15. The image processing apparatus of claim 14, wherein the sparse feature map operation sub-module comprises:
a feature activity map generation unit that determines a feature activity map corresponding to each convolution layer of the sparse convolution neural network based on the structure of the sparse convolution neural network and the two-dimensional image; and a sparse feature map operation unit that obtains the sparse feature map by the sparse convolution neural network using each feature activity map and the two-dimensional image.

16. The image processing apparatus of claim 10, wherein the image processing apparatus further comprises a feature map analysis module that performs region feature extraction on the obtained sparse feature map, identifies an object that changes the monitored scene based on extracted region features and determines a location, motion trajectory, behavior, or identity of the object if the identified object is a person.

17. A computer-readable storage medium storing a computer program, when the computer program is performed by a processor, to implement the image processing method of claim 1.

* * * * *